J. W. LEWIS.
Ventilating-Pad for Harness.

No. 219,487. Patented Sept. 9, 1879.

WITNESSES:
Francis McArdle
C. Sedgwick

INVENTOR:
J. W. Lewis
BY Munn &Co.
ATTORNEYS.

UNITED STATES PATENT OFFICE.

JOHN W. LEWIS, OF LESTER MANOR, VIRGINIA.

IMPROVEMENT IN VENTILATING-PADS FOR HARNESS.

Specification forming part of Letters Patent No. 219,487, dated September 9, 1879; application filed July 11, 1879.

*To all whom it may concern:*

Be it known that I, JOHN W. LEWIS, of Lester Manor, in the county of King William and State of Virginia, have invented a new and Improved Ventilating-Pad for Harness, &c., of which the following is a specification.

My invention relates to pads for use with horse-collars, breast-straps, saddles, back-bands, and other parts of harness, to give elastic pressure on the animal, furnish ventilation to prevent galling, and permit the use of the harness upon galled animals without hindering the healing of the sores.

The invention consists in a harness-pad formed of parallel perforated rubber tubes, secured together in position by similar tubes attached at right angles thereto, as hereinafter more particularly described.

The improved pad is shown in the accompanying drawings, wherein—

Figure 1:
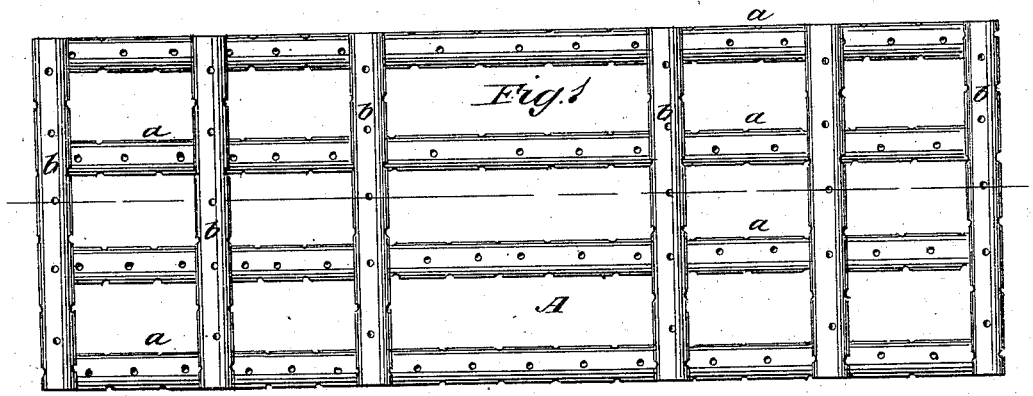
Figure 2:
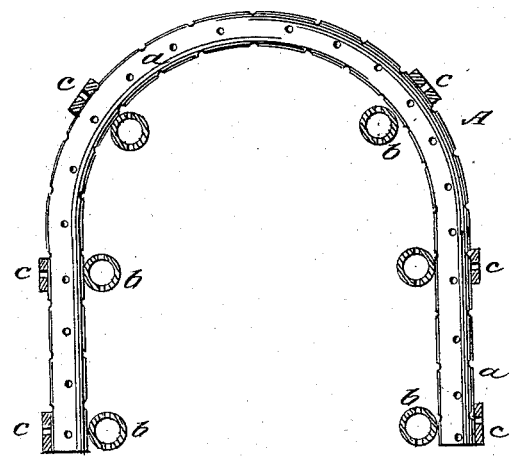
Figure 3:
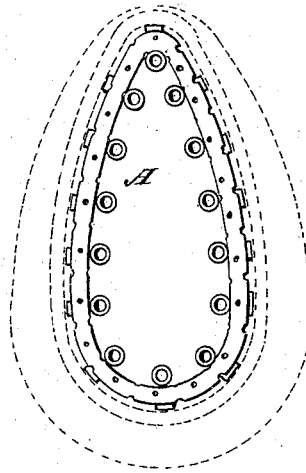

Figure 1 is a plan view of one form of pad. Fig. 2 is a sectional side view of the same bent as in use with a saddle or back-band. Fig. 3 shows the pad as applied to a collar.

Similar letters of reference indicate corresponding parts.

A is my improved ventilating-pad, which is made as follows: $a$ are small tubes of rubber, cut to the length desired for the pad, and perforated on all sides throughout their length with numerous holes. Upon the under side of the pad similar tubes $b$ are attached crosswise to tubes $a$, and upon the upper side stays $c$, of rubber, leather, or other suitable material, are attached. The stays $c$ serve to retain the tubes $a$ in place and prevent their separation.

The tubes $a$ are placed a short distance apart to form a pad of the desired width, and the tubes $b$ may be more or less numerous, as desired. The latter are attached by rivets or other similar devices, or they may be molded upon tubes $a$, or attached by suitable cement.

In use, the pads are placed beneath the collar, saddle, or other part of the harness, and retained in place by fastenings attached to the ends, or by the fastenings of the harness. The pads being flexible, they conform to shape and fit snugly upon the shoulders or back of the animal, and receive the weight and pressure, so that the leather is not in contact with the horse. The spaces between the tubes and the perforations give perfect ventilation and access of air, so that galling is prevented, and in the case of a galled horse the pad can be adjusted to prevent any pressure upon the sores and the horse worked without preventing healing.

I do not limit myself to the size or form of the pad, as the tubes may be bent and secured to form suitable pads for any special portion of the harness.

I am aware that parallel rubber tubes have been used in harness-pads; but they are so compressed by the weight as to admit of little or no ventilation.

What I claim as new and of my invention is—

A harness-pad formed of a system of parallel perforated rubber tubes secured together in position by similar tubes attached at right angles thereto, substantially as shown and described.

JOHN WASHINGTON LEWIS.

Witnesses:
W. S. E. WILBURN,
A. GOODSON.